FIG. 1
FIG. 2
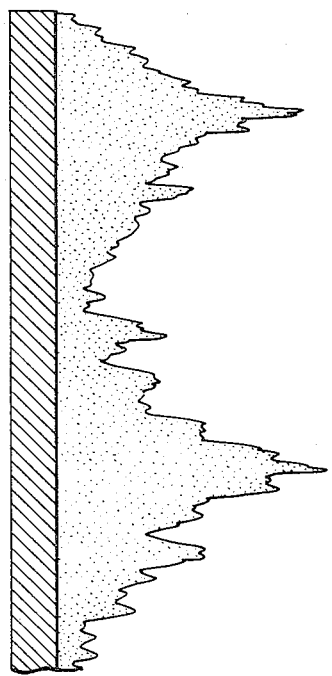
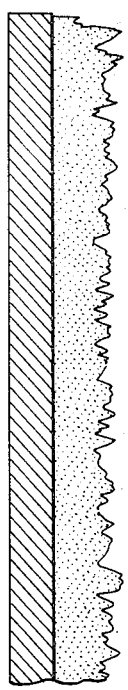
INVENTORS,
HARRY G. OSWIN
CHARLES W. FLEISCHMANN
JAMES E. OXLEY

United States Patent Office 3,553,027
Patented Jan. 5, 1971

---

3,553,027
ELECTROCHEMICAL CELL WITH LEAD-CONTAINING ELECTROLYTE AND METHOD OF GENERATING ELECTRICITY
Harry G. Oswin, Chauncey, N.Y., James E. Oxley, Hollywood Hills, Calif., and Charles W. Fleischmann, Hempstead, N.Y., assignors to Leesona Corporation, Warwick, R.I., a corporation of Massachusetts
Filed Feb. 2, 1968, Ser. No. 702,657
Int. Cl. H01m 27/00
U.S. Cl. 136—86                                10 Claims

ABSTRACT OF THE DISCLOSURE

An improved rechargeable cell for generating electrical energy is described. The cell comprises a zinc anode, an alkaline electrolyte and a cathode. The electrolyte contains minor amounts of lead ions. The lead ions suppress dendrite formation upon charging the cell greatly increasing the cell's life.

FIELD OF INVENTION AND PRIOR ART

This invention is directed to an improved electrochemical cell for generating electrical energy. More particularly the invention is directed to a cell comprising a zinc anode, an alkaline electrolyte, and a cathode wherein dendrite formation within the cell is eliminated or minimized by including minor amounts of lead in the electrolyte.

Galvanic cells comprising a zinc anode in conjunction with an alkaline hydroxide and known metal cathodes, such as a porous silver cathode, are highly desirable in view of the high current outputs theoretically obtainable. More recently, zinc/air cells have received wide recognition in view of their high energy/density ratio, high current capacity and their rapid discharge rate. However, the rechargeability of the aforesaid cells is limited in that the product of zinc discharge, namely zinc oxide, is readily soluble in the alkaline electrolyte as the zincate ion. During the charging portion of the cycle the zinc of the zincate ion is plated out in the form of dendrites. More specifically, during discharge of the zinc electrodes three reactions can occur:

(1) $Zn + 2OH^- \rightarrow ZnO_{(Solid)} + H_2O + 2e$ 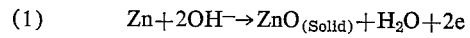

(2) $Zn + 2OH^- \rightarrow Zn(OH)_{2(Solid)} + 2e$ 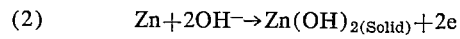

and (3) $Zn + 4OH^- \rightarrow Zn(OH)_{4(Solution)}^= + 2e$ 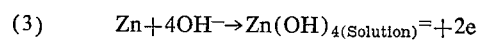

Dendrite growth occurs during the charge portion of the cycle as a result of the reverse of reaction three, i.e.

(4) $Zn(OH)_{4(Solution)}^= + 2e \rightarrow Zn + 4OH^-$ 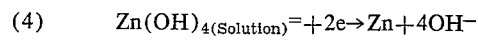

Two main types of dendrites, mossy and crystalline, can form depending upon whether the process is activation or diffusion controlled, respectively. [Apparently all dendrites including the mossy variety are crystalline to some extent. In the present context the term "crystalline" defines the micro-crystalline form.] The crystalline variety is the most undesirable and is often responsible for early failure of the galvanic cell due to shorting, loss of capacity due to break away of active material from the negative plate, and causes variability of performance and limited cycle life.

Although the problem of dendrite growth has been actively investigated in the battery art for a number of years, and a number of solutions suggested for minimizing the problem, no completely acceptable solution has been advanced to date.

OBJECTS AND GENERAL DESCRIPTION OF INVENTION

Accordingly, it is an object of the present invention to provide an electrochemical cell comprising a zinc anode, an alkaline electrolyte and a cathode which is not substantially effected by dendrite growth.

It is another object of this invention to provide an electrochemical cell comprising a zinc anode, an alkaline electrolyte and a cathode wherein the cell has a greatly increased cycle life.

It is another object of this invention to provide a galvanic cell comprising a zinc anode, an alkaline electrolyte, and a cathode wherein the electrolyte contains minor amounts of lead which suppresses the dendrite formation during the charge cycle.

These and other objects of the invention will be more readily apparent from the following detailed description with particular emphasis being placed upon the example and drawing.

In accordance with the present invention the dendrite formation in a rechargeable or secondary electrochemical cell comprising a zinc anode, an alkaline electrolyte and a cathode can be eliminated or substantially minimized by having minor amounts of lead ions in the electrolyte. The exact reason for the elimination of dendrites is not completely understood. However, it has been observed that the lead ions in the zincate solution cause the zinc in solution to plate out as an adherent deposit. Although the lead apparently plates out with the zinc, it redissolves in the electrolyte possibly upon discharge of the battery to maintain the lead ion concentration in the electrolyte.

The lead can be added to the electrolyte as any of its soluble salts, including the nitrates, acetates, and plumbates or the lead can be incorporated in the zinc anode and allowed to dissolve into the electrolyte. It is essential, however, that the lead ions are actually present in the electrolyte. Normally the electrolytes contain from about 0.2 to about 2.0 grams of lead per litre of electrolyte. Less lead is ineffective in preventing dendrite growth, whereas more lead results in a confused mass of non-adherent dendrites containing lead. In the aforesaid critical range of lead concentration lead atoms apparently co-deposit with the zinc to give the adherent deposit desired, rather than the uneven crystalline or mossy deposits. Preferably, the lead should be present in the electrolyte at from about 0.5 to 1.0 gram of lead per litre of electrolyte. In the event the lead is contained in the electrode, sufficient lead must be present in order that, upon dissolution of the lead from the electrode, the electrolyte will contain the aforesaid amounts of lead.

The temperature at which the recharging of the cell occurs is not critical. The recharging has been carried out over a wide temperature range with the improved cycle life of the battery being essentially uniform at the various temperatures. Moreover, any of the prior art methods of recharging an electrochemical cell such as direct recharging at varying current densities, recharging at varying rates over the total charge time, pulse and reversal charge techniques, can be utilized. Furthermore, various consumable metal cathodes such as silver, nickel, manganese or the like can be used. Additionally, the improved cycle life can be obtained in a zinc/air battery of the type described in the Oswin co-pending application Ser. No. 533,516 filed Mar. 11, 1966. It is only essential that the cathode selected be compatible with the electrolyte and the lead ions contained therein and be electronegative with respect to the zinc anode.

DRAWING AND EXAMPLES

Having described the invention in general terms, the following examples, with particular reference to the drawing, will be set forth to more fully illustrate the invention. In the drawing, FIG. 1 is an enlarged cross section of an electrode showing the nature of the zinc growth in the absence of lead ions; FIG. 2 is an enlarged cross section of an electrode illustrating the even and smooth distribution of the zinc deposit when lead ions are present in the electrolyte.

EXAMPLE I

A conventional silver zinc cell is constructed utilizing a 43% aqueous potassium hydroxide electrolyte solution. The negative electrode employed comprises a porous zinc structure having a porosity of 75% and the positive electrode comprises a porous silver structure having a porosity of 60%. The zinc electrode is prepared by slurrying zinc metal particles with water, compacting at a pressure of 100 p.s.i. to remove most of the water, drying at 100° C. for a period of sixty minutes and thereafter bonding the zinc particles at a temperature of 280° C. for forty minutes. The silver electrode is formed in like manner. However, the final sintering is performed at a temperature of 530° C. for fifty-five minutes. After sintering the electrode is oxidized anodically in 30% aqueous KOH to form the silver oxide. The negative and positive electrodes are electrically separated by a fibrous cellulose membrane which contains the potassium hydroxide electrolyte. Prior to adding the electrolyte sufficient lead acetate was added to the electrolyte solution to provide 0.5 gram lead per litre of electrolyte. After discharging the cell recharging was carried out at a current density of 5 ma./cm.$^2$ until the cell is completely charged. The cell was subjected to 20 continuous cycles with the battery performing after the last cycle substantially as well as after the first cycle.

EXAMPLE II

A cell was constructed substantially identical to the cell described in Example I. However, 1% by weight of lead was incorporated in the zinc electrode of the cell. The cell was subjected to continuous discharge and charge cycles for a total of 20 cycles. The battery performs substantially identical after the last cycle as it did after the first cycle. The cell was taken apart and the zinc growth on the anode was adherent and continuous, substantially as shown in FIG. 2.

EXAMPLE III

A cell was constructed substantially as described in Example I with the exception that no lead was incorporated either in the electrolyte of the cell or in an electrode structure. The cell, when charged and discharged continuously for a total of 10 cycles, deteriorated completely in performance. The cell was taken apart and the zinc growth on the anode was substantially as shown in FIG. 1, apparently causing shorting of the cell, leading to the cell's failure.

EXAMPLE IV

An air battery was constructed comprising a porous zinc anode having a conductive screen extending the length of the anode and wrapped with fiber reinforced cellulose and a composite cathode comprising a polytetrafluoroethylene membrane in intimate contact with a conductive nickel screen and a layer of uniformly mixed polytetrafluoroethylene particles and platinum black. The loading of platinum in the catalyst layer was approximately 8 milligrams platinum per square centimeter of the cathode surface. The catalytic layer of the cathode was in intimate contact with the reinforced cellulose wrapped around the anode. The cellulose wrap was impregnated with 28% aqueous potassium hydroxide electrolyte solution containing 0.5 gram lead per litre of electrolyte. The unit was sealed from the top to provide a fluid-tight cell. The cell was subjected to continuous charge and discharge cycles for a total of 20 cycles without noticeable adverse effect on performance.

EXAMPLE V

A zinc air cell was constructed substantially identical to that set forth in Example IV with the exception that no lead was incorporated in the electrolyte of the cell. When subjected to continuous charge and discharge cycles the cell after 8 cycles had suffered substantially total deterioration.

In the aforesaid examples the percentage of lead ions was varied from 0.2 to about 2.0 grams of lead per litre of electrolyte with substantially improved cycle life being obtained in the batteries. The greatest improvement in cycle life occurred when the lead ions were present at from 0.5–1.0 gram of lead per litre of electrolyte.

The electrolyte employed in the electrochemical cells according to the present invention can be any alkali hydroxide electrolyte including sodium hydroxide, cesium hydroxide, rubidium hydroxide, lithium hydroxide, potassium hydroxide, and mixtures thereof, as well as the alkaline earth hydroxides such as calcium hydroxide, strontium hydroxide, barium hydroxide.

It should be appreciated that the instant invention is not to be construed as being limited by the illustrative examples. It is possible to produce still other embodiments without departing from the inventive concept herein disclosed. Such embodiments are within the ability of one skilled in the art.

It is claimed:

1. An electrochemical cell comprising an alkaline electrolyte and electrodes immersed therein, one of said electrodes comprising a zinc element and said cell electrolyte containing ionic lead in an amount of from about 0.2 to about 2.0 grams of lead per litre of electrolyte.

2. The electrochemical cell of claim 1 wherein the lead is present in an amount of from about 0.5 to 1.0 gram of lead per litre of the electrolyte of the cell.

3. The electrochemical cell of claim 1 wherein the lead ions are incorporated in the electrolyte as a soluble lead salt.

4. A rechargeable metal/air electrochemical cell comprising: a porous zinc anode body; a cathode member having a hydrophobic membrane with its inner surface coated with a catalyst layer; an alkaline electrolyte solution in contact with said anode and cathode; said electrolyte including lead ions in an amount of from about 0.2 to about 2.0 grams of lead per litre of electrolyte.

5. The rechargeable metal/air electrochemical cell of claim 4 having from 0.5 to 1.0 gram of lead per litre of electrolyte.

6. The rechargeable metal/air electrochemical cell of claim 4 wherein the lead ions are incorporated in the electrolyte as a soluble lead salt.

7. In an improved method of generating electricity with a rechargeable metal/oxygen-containing gas electrochemical cell which comprises a porous zinc anode body, a cathode member having a hydrophobic membrane coated on the inner surface with a catalyst layer, an alkaline electrolyte solution in contact with said anode and cathode, comprising the steps of electrochemically reacting said zinc and oxygen-containing gas to generate electricity and zinc oxide and thereafter electrically reforming said zinc in-situ, the improvement comprising providing lead ions in said electrolyte in an amount sufficient to prevent dendrite growth during said reforming but not in an amount which would result in a confused mass of non-adherent dendrites containing lead.

8. The improved method of claim 7 wherein said lead ions are present in said cell electrolyte in an amount of from about 0.2 to about 2.0 grams per litre of electrolyte.

9. The improved method of claim 7 wherein said lead ions are present in said cell electrolyte in an amount of from about 0.5 to about 1.0 grams per litre of electrolyte.

10. The improved method of claim 7 wherein the lead ions are incorporated in the electrolyte as a soluble lead salt.

References Cited

UNITED STATES PATENTS

| | | | |
|---|---|---|---|
| 396,213 | 1/1889 | Lugo | 136—30 |
| 3,000,996 | 9/1961 | Usel | 136—86UX |
| 3,382,102 | 5/1968 | Zito, Jr. | 136—86X |
| 3,393,099 | 7/1968 | Giner et al. | 136—86 |
| 3,287,168 | 11/1966 | Marsh | 136—120FCX |
| 3,444,003 | 5/1969 | Moser | 136—120FC |

FOREIGN PATENTS 237,314  4/1959  Australia _____ 136—30

ALLEN B. CURTIS, Primary Examiner

U.S. Cl. X.R.

136—30